United States Patent
Guzman et al.

(10) Patent No.: US 11,553,129 B2
(45) Date of Patent: Jan. 10, 2023

(54) CAMERA ORCHESTRATION TECHNOLOGY TO IMPROVE THE AUTOMATED IDENTIFICATION OF INDIVIDUALS

(71) Applicant: Intel Corporation, Santa Clara, CA (US)

(72) Inventors: Mateo Guzman, Beaverton, OR (US); Javier Turek, Beaverton, OR (US); Marcos Carranza, Portland, OR (US); Cesar Martinez-Spessot, Hillsboro, OR (US); Dario Oliver, Hillsboro, OR (US); Javier Felip Leon, Hillsboro, OR (US); Mariano Tepper, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/907,872

(22) Filed: Jun. 22, 2020

(65) Prior Publication Data
US 2020/0322528 A1 Oct. 8, 2020

(51) Int. Cl.
*H04N 5/232* (2006.01)
*H04N 7/18* (2006.01)
(Continued)

(52) U.S. Cl.
CPC ........... *H04N 5/23219* (2013.01); *G06T 7/70* (2017.01); *G06V 40/166* (2022.01);
(Continued)

(58) Field of Classification Search
CPC ........... H04N 5/23229; H04N 5/23299; H04N 5/23296; H04N 5/247; H04N 5/23219;
(Continued)

(56) References Cited

U.S. PATENT DOCUMENTS

2015/0350537 A1* 12/2015 Debevec ............... B60R 21/215
  348/169
2016/0360101 A1* 12/2016 Venetianer ........... H04N 5/2353
(Continued)

OTHER PUBLICATIONS

Amaryllo.com, "Apollo Biometric Camera," <amaryllo.us/apollo>, retrieved Sep. 21, 2020, 6 pages.
(Continued)

*Primary Examiner* — Neil R Mikeska
(74) *Attorney, Agent, or Firm* — Jordan IP Law, LLC

(57) ABSTRACT

Systems, apparatuses and methods may provide for technology that detects an unidentified individual at a first location along a trajectory in a scene based on a video feed of the scene, wherein the video feed is to be associated with a stationary camera, and selects a non-stationary camera from a plurality of non-stationary cameras based on the trajectory and one or more settings of the selected non-stationary camera. The technology may also automatically instruct the selected non-stationary camera to adjust at least one of the one or more settings, capture a face of the individual at a second location along the trajectory, and identify the unidentified individual based on the captured face of the unidentified individual.

28 Claims, 8 Drawing Sheets

(51) Int. Cl.
  *G06T 7/70* (2017.01)
  *G06V 40/16* (2022.01)
(52) U.S. Cl.
  CPC ......... *H04N 5/23299* (2018.08); *H04N 7/181* (2013.01); *G06T 2207/10016* (2013.01); *G06T 2207/20081* (2013.01); *G06T 2207/20084* (2013.01); *G06T 2207/30201* (2013.01); *G06T 2207/30241* (2013.01)
(58) Field of Classification Search
  CPC ............... H04N 7/181; G06K 9/00255; G06K 9/00771; G06K 9/209; G06T 7/70; G06T 2207/30201; G06T 2207/10016; G06T 2207/20084; G06T 2207/20081; G06T 2207/30241
  See application file for complete search history.

(56) References Cited

U.S. PATENT DOCUMENTS

| | | | | |
|---|---|---|---|---|
| 2017/0006215 | A1* | 1/2017 | Leung | G08B 13/19641 |
| 2019/0130167 | A1* | 5/2019 | Ng | G06K 9/00268 |
| 2019/0197369 | A1* | 6/2019 | Law | G06K 9/0063 |
| 2019/0325584 | A1* | 10/2019 | Peled | G05D 1/101 |
| 2020/0143561 | A1* | 5/2020 | Hallett | G06T 7/292 |
| 2020/0279279 | A1* | 9/2020 | Chaudhuri | G06K 9/00335 |
| 2020/0344409 | A1* | 10/2020 | Bermejo Fernandez | H04N 5/23206 |

OTHER PUBLICATIONS

E. Bilgazyev et al., "Improved face recognition using super-resolution," 2011 International Joint Conference on Biometrics (IJCB), Oct. 2011, 7 pages, IEEE, Washington, DC.

N. Cazin et al., "Reservoir computing model of prefrontal cortex creates novel combinations of previous navigation sequences from hippocampal place-cell replay with spatial reward propagation," PLOS Computational Biology, Jul. 15, 2019, Version 2, PLOS, San Francisco, California.

S. Hochreiter et al., "Long Short-Term Memory," Neural Computation, 1997, <bioinf.jku.at/publications/older/2604.pdf>, 32 pages.

Milestonesys.com, "Milestone Systems Video Management Software," 11 pages, <milestonesys.com/solutions/platform/video-management-software/>, retrieved Sep. 21, 2020.

Onvif.org, "ONVIF Conformance. What does it mean?", 2 pages, <onvif.org>, retrieved Sep. 21, 2020.

Safr.org, "SAFR for Milestone XProtect," 5 pages, <milestonesys.com/marketplace/realnetworks-inc/safr-facial-recognition-for-milestone-xprotect/>, retrieved Sep. 21, 2020.

Sutton et al., "Reinforcement Learning," 1998, 24 pages, second edition.

M. Tepper, "Do Place Cells Dream of Conditional Probabilities? Learning Neural Nystrom Representations," Jun. 5, 2019, 16 pages.

* cited by examiner

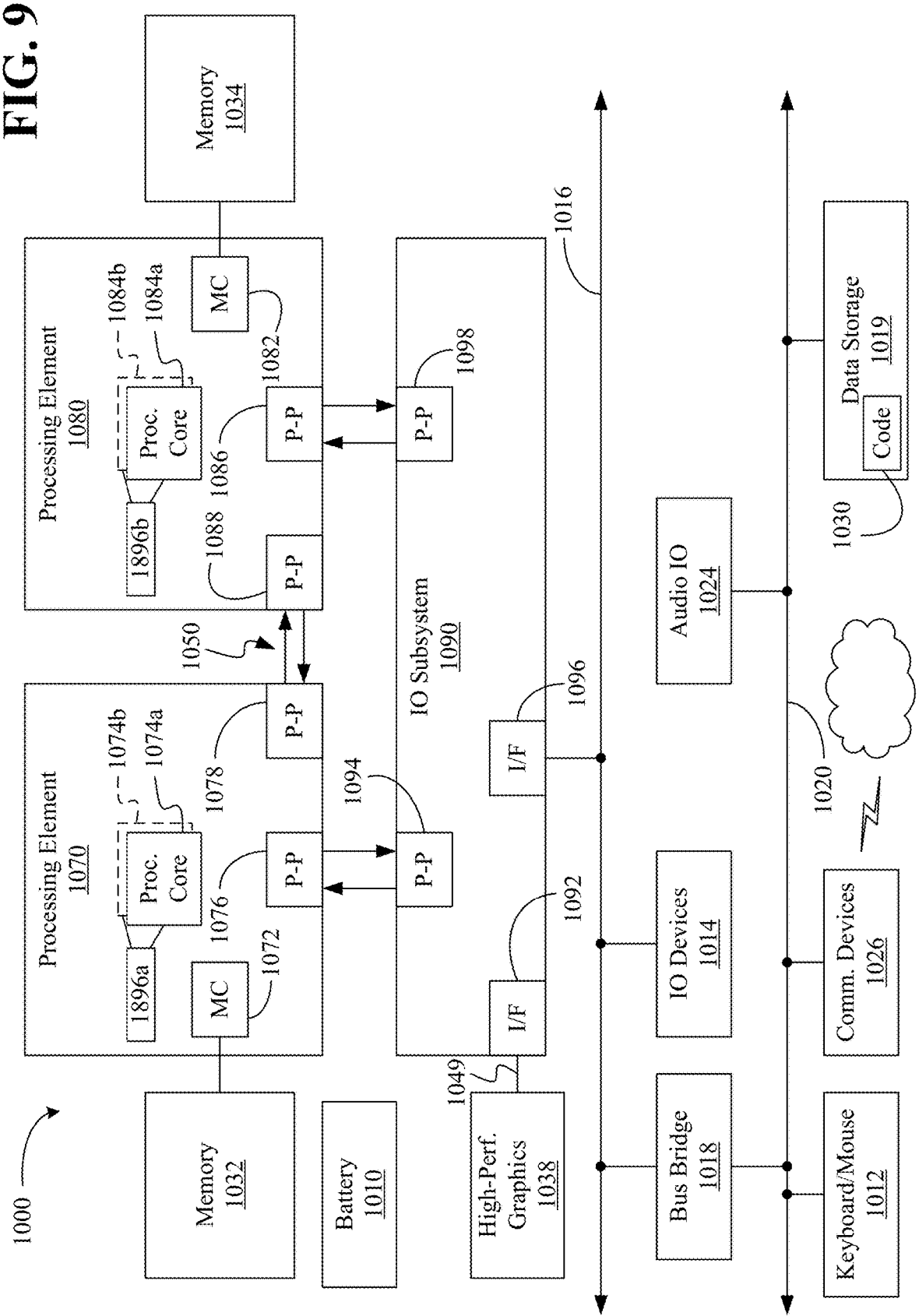

CAMERA ORCHESTRATION TECHNOLOGY TO IMPROVE THE AUTOMATED IDENTIFICATION OF INDIVIDUALS

TECHNICAL FIELD

Embodiments generally relate to the automated identification of individuals. More particularly, embodiments relate to camera orchestration technology to improve the automated identification of individuals.

BACKGROUND

The identification of individuals in open spaces (e.g., train stations, airports, stadiums) is often useful for security and/or public safety purposes. Conventional solutions may involve the deployment of a relatively high number of cameras facing in many different directions to increase the likelihood that the faces of individuals will be captured. In such a case, artificial intelligence (AI) modules and/or super resolution techniques may be used to automatically recognize the captured faces. The costs, however, of the equipment and the processing overhead in such configurations may be relatively high. For example, analyzing every frame of the video feeds (e.g., even when the frames contain no useful data) may be very costly from a processing perspective. While other solutions may use pan, tilt, zoom (PTZ) cameras, those solutions typically involve manually intensive operation and/or recognition (e.g., potentially leading to errors) and may suffer from blind spots in the space being monitored.

BRIEF DESCRIPTION OF THE DRAWINGS

The various advantages of the embodiments will become apparent to one skilled in the art by reading the following specification and appended claims, and by referencing the following drawings, in which:

FIG. 9 is a block diagram of an example of a multi-processor based computing system according to an embodiment.

DESCRIPTION OF EMBODIMENTS

In general, embodiments include one or more fixed high-resolution/wide field of view cameras per area, strategically positioned to reduce occlusions and blind spots of the monitored area. The fixed camera(s) may detect and track individuals/people in the area of interest. In one example, tracking information is sent to a centralized video analytics component that controls a set of deployed PTZ cameras to obtain the best frame (e.g., with higher probabilities of face recognition success) based on the tracked trajectory of each person. All cameras may stream video to the centralized video analytics component via RTSP (Real Time Streaming Protocol), RTMP (Real Time Messaging Protocol) protocols, or any other standard protocol.

In an embodiment, the centralized video analytics component calculates the person position, trajectory, and possibly head direction, which are used to select the best positioned PTZ camera to capture the face of the person, and sends appropriate PTZ configuration signals/actions using standardized protocols such as an ONVIF (Open Network Video Interface Forum) protocol. Each person entering the covered area may be tracked and flagged as unidentified while the system prepares the PTZ cameras to identify a selected person. Once the person is identified, the PTZ camera dedicated to the person in question is freed for the next detection. Accordingly, the number of people that may be identified at the same time is at least proportional to the number of deployed PTZ cameras, considering that one of the PTZ cameras may cover more than one person (e.g., since a group of people may have the same trajectory and position for a good capture). The selection of the person of interest may be done based on various factors such as user preference, activity level, clothes color, size, speed, trajectory smoothness, etc., or any combination thereof.

Figure 1:
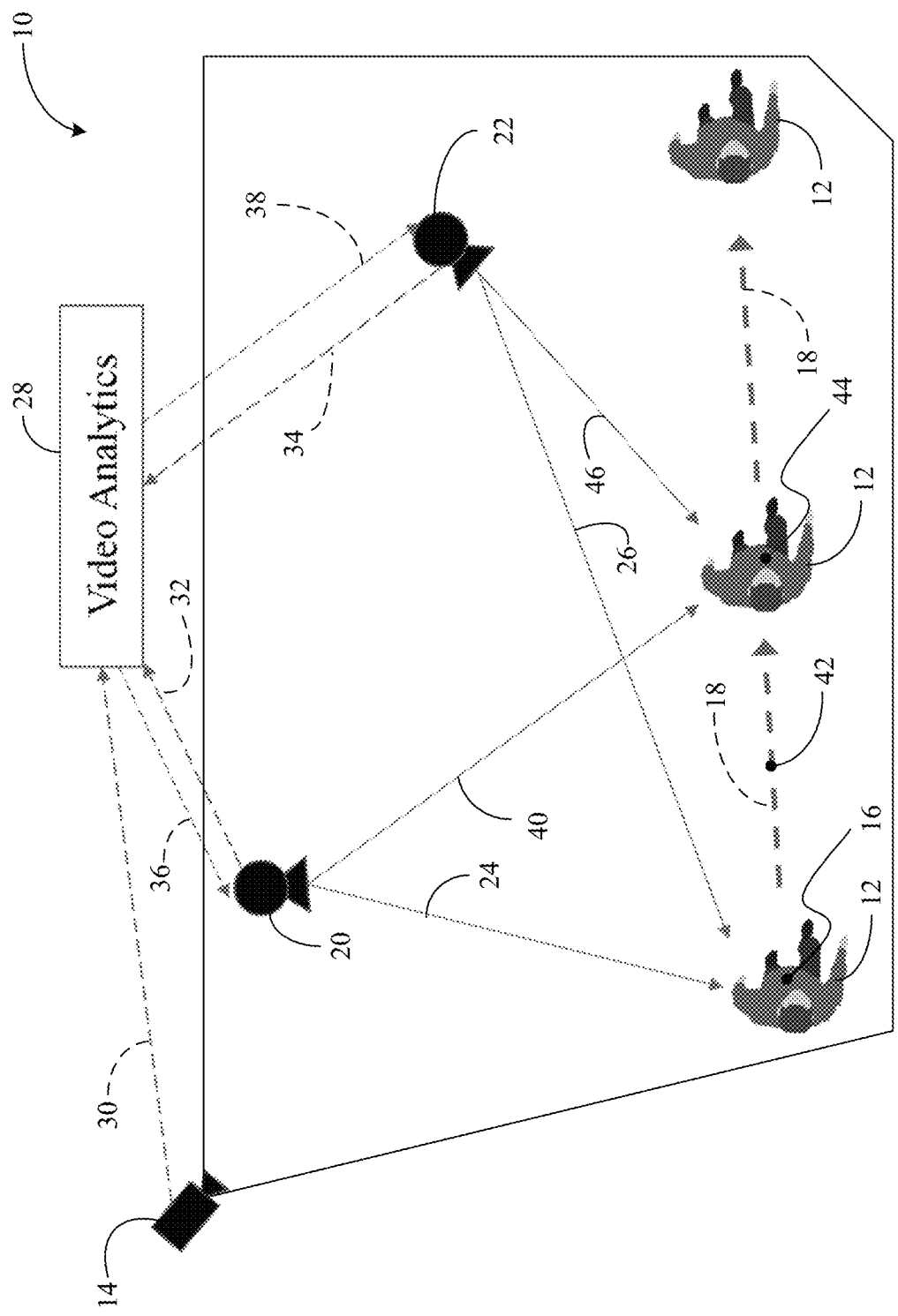
FIG. 1 is a plan view of an example of a space being monitored according to an embodiment.

Turning now to FIG. 1, a space 10 (e.g., train station, airport, stadium, arena, etc.) is monitored by a fixed (e.g., stationary) camera 14 for the presence of unidentified individuals such as, for example, an individual 12. In an embodiment, the individual 12 is detected at a first location 16 (e.g., position coordinates 1,1,0) along a trajectory 18 at a time t1. At the first location 16, the individual 12 may be within the field of view (FoV) of a first pan, tilt, zoom (PTZ, e.g., non-stationary) camera 20 having a first line of sight (LoS) 24 to the individual 12. In the illustrated example, the first LoS 24 only provides a profile/side view of the face of the individual 12. Accordingly, automated face recognition techniques may be ineffective from the first LoS 24. At the first location 16, the individual 12 may also be within the FoV of a second PTZ camera 22, where the second PTZ camera 22 has a second LoS 26 to the individual 12. Although the second LoS 26 may provide a nearly frontal view of the face of the individual 12, the distance between the individual 12 and the second PTZ camera 22 may be too great for automated face recognition techniques to be effective from the second LoS 26.

As will be discussed in greater detail, embodiments provide for a video analytics subsystem 28 (e.g., including logic instructions, configurable logic, fixed-functionality hardware logic, etc., or any combination thereof) that uses a fixed video feed 30 from the fixed camera 14 to send orchestration signals 36 and 38 (e.g., wired and/or wireless) to the first and second PTZ cameras 20, 22, respectively, where the orchestration signals 36, 38 enable at least one of the PTZ cameras 20, 22 to capture the face of the individual 12 at an angle that is sufficient effectively perform face recognition. More particularly, the illustrated video analytics subsystem 28 automatically predicts that the trajectory 18 will include a second location 42 at time t2 and a third location 44 (e.g., position coordinates 2,1,0) at a time t3. The video analytics subsystem 28 may also determine that the first PTZ camera 20 has a third LoS 40 to the individual 12 at the third location 44. In the illustrated example, the third LoS 40 provides no view of the face of the individual 12. Accordingly, automated face recognition techniques will be ineffective from the third LoS 40.

By contrast, the second PTZ camera 22 may have a fourth LoS 46 that provides a nearly frontal and relatively close view of the face of the individual 12. In such a case, the video analytics subsystem 28 uses the orchestration signals 38 to proactively instruct the second PTZ camera 22 to adjust one or more internal settings (e.g., pan settings, zoom settings, tilt settings) of the second PTZ camera 22 so that the second PTZ camera 22 will capture the face of the individual 12 at the third location 44. In an embodiment, the orchestration signals 38 also instruct the second PTZ camera 22 to identify the individual 12 based on the captured face of the individual 12. In one example, the video analytics subsystem 28 also receives a first PTZ video feed 32 from the first PTZ camera 20 and a second PTZ video feed 34 from the second PTZ camera 22.

The illustrated solution reduces equipment costs by eliminating any need for a relatively high number of cameras. For example, because the PTZ cameras 20, 22 are automatically adjustable to different lines of sight, the PTZ cameras 20, 22 may effectively perform the functionality of a large array of stationary cameras. The illustrated solution also reduces processing costs by dedicating the face recognition to video frames that are known to contain useful content. For example, the first PTZ video feed 32 may be disregarded with respect to the individual 12 in terms of face recognition. Indeed, the first PTZ video feed 32 might be used to identify another individual (not shown) moving through the space 10 while the illustrated individual 12 is moving through the space 10. The illustrated solution also enhances performance at least to the extent that human error is eliminated from the camera operation and/or face recognition process. Performance may be further enhanced through the elimination of blind spots in the space 10.

Animals (e.g., rats) are equipped to efficiently learn to search for multiple sources of food or water in a complex environment. For this, they generate increasingly efficient trajectories between reward sites. Such spatial navigation capacity involves mentally replaying short activity sequences of place cells that are spatially and temporally related. Similar to such a biological system, embodiments orchestrate and control the PTZ cameras 20, 22. The trajectories followed by people traversing the space may form the basis (e.g., for learning and inference) of a trajectory-prediction system. As will be discussed in greater detail, such a system may be modeled with the combination of a camera operation subsystem (e.g., including a set of fixed cameras and a set of PTZ cameras), a space representation stage, a trajectory prediction stage, and a reinforcement stage.

Figure 2:
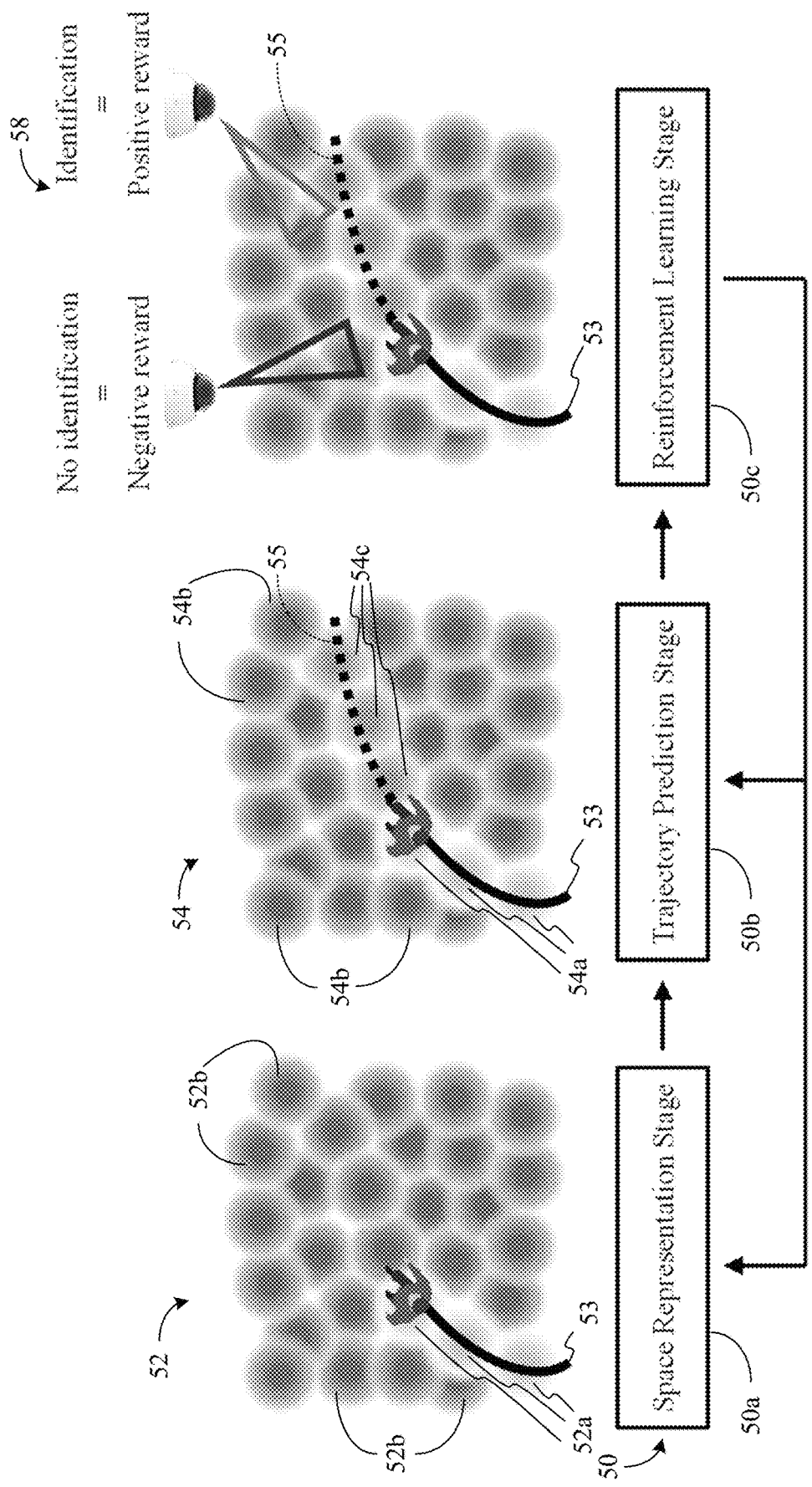
FIG. 2 is an illustration of an example of a back-propagation of real-time reinforcement data to a space representation stage and a trajectory prediction stage according to an embodiment.

FIG. 2 shows a video analytics subsystem 50 (50a-50c) that may be readily substituted for the video analytics subsystem 28 (FIG. 1), already discussed. In the illustrated example, a space representation stage 50a produces a summarized representation of the physical space, which is more detailed around high-reward areas and coarser in other areas. This stage 50a may be modelled with a neural network (e.g., first neural network, not shown). In an embodiment, the representation takes the form of a soft-tiling 52 (52a-52b) of the space into observed place cell activity 52a and inactive place cells 52b. By soft-tiling, a set of units tile the space while partially and locally overlapping one another. The observed place cell activity 52a (e.g., occupied tiles) exhibit activity corresponding to an observed trajectory 53, while the inactive place cells 52b (e.g., non-occupied tiles) are silent.

Given the partial observed trajectory 53 through the space, a trajectory prediction stage 50b may use a recurrent neural network (e.g., second neural network, not shown) to predict the subsequent movement of the individual in a trajectory tiling 54 (54a-54c) that includes predicted place cell activity 54c corresponding to a future trajectory 55, in addition to the observed place cell activity 54a and the inactive place cells 54b. In an embodiment, this neural network learns to predict trajectories so that the person may be successfully identified. This prediction will be steered by the likelihood of successfully identifying a person.

In addition, a reinforcement learning (RL) stage 50c (e.g., control system) may operate the cameras through the camera operation system and inform the other stages about the usefulness of the outputs (e.g., predicted trajectories) from those stages based on rewards. The RL stage trains internal one or more policy neural networks (e.g., a third neural network, not shown), the neural network in the space representation stage 50a and the neural network in the trajectory prediction stage 50b to maximize the likelihood of collecting the largest number of rewards. For example, a reward scheme 58 might provide the largest number of identifications for each person traversing the space. Moreover, a fourth neural network may perform face detection and provide feedback to the other three neural networks (e.g., indicating whether the system was able to detect the face, that is the reward of the reinforcement learning). In such a case, the other three neural networks may adjust accordingly to achieve better rewards in the future.

In one example, trajectory speeds are implicitly handled by the system, as frame rates are known and constant. As will be discussed in greater detail, all stages may be trained in an end-to-end fashion, by using, for example, temporal difference learning. In such a case, the errors are backpropagated throughout the space representation stage 50a and the trajectory prediction stage 50b.

Figure 3:
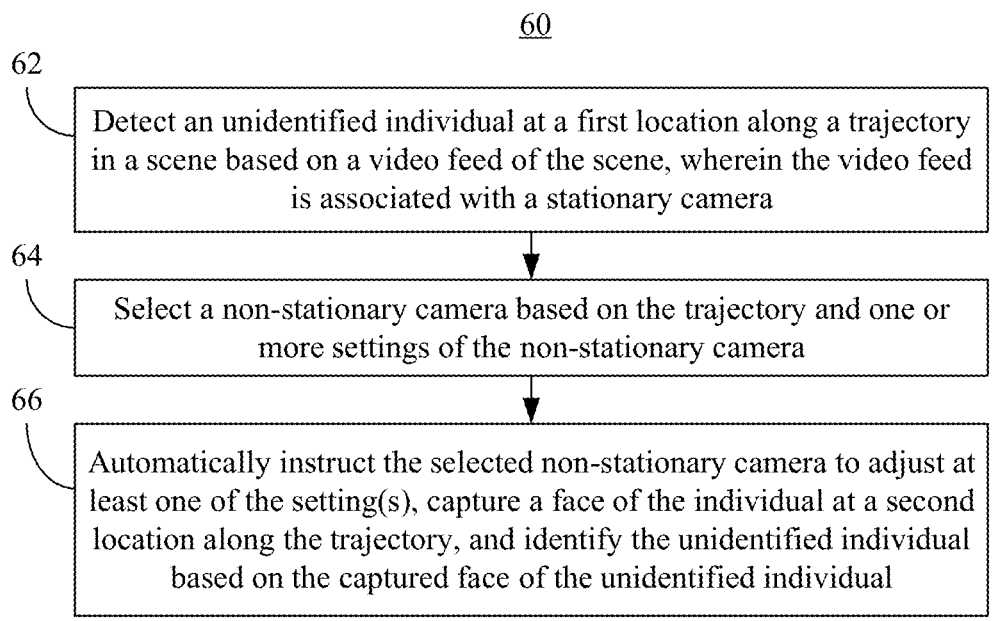
FIG. 3 is a flowchart of an example of a method of operating a performance-enhanced computing system according to an embodiment.

FIG. 3 shows a method 60 of operating a performance-enhanced computing system. The method 60 may generally be implemented in a video analytics subsystem such as, for example, the video analytics subsystem 28 (FIG. 1) and/or the video analytics subsystem 50 (FIG. 2), already discussed. More particularly, the method 60 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 60 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 62 provides for detecting an unidentified individual at a first location along a trajectory in a scene based on a video feed of the scene, wherein the video feed is associated with a stationary (e.g., fixed) camera. In an embodiment, block 62 includes predicting the trajectory based on the video feed. Block 64 selects a non-stationary (e.g., PTZ) camera based on the trajectory and one or more settings of the non-stationary camera. In one example, the non-stationary camera is selected from a plurality of non-stationary cameras. The selected non-stationary camera may be automatically instructed at block 66 to adjust at least one of the one or more settings, capture a face of the individual at a second location along the trajectory, and identify (e.g., recognize) the unidentified individual based on the captured face of the unidentified individual. In an embodiment, the selected non-stationary camera is automatically instructed in response to the face of the unidentified individual being absent from the video feed from the stationary camera. Additionally, the selected non-stationary camera may be instructed to adjust the at least one of the setting(s) prior to the unidentified individual reaching the second location. Additionally, block 66 may involve automatically instructing the selected non-stationary camera to identify the unidentified individual based on a reduced number of frames containing the captured face of the unidentified individual (e.g., rather than continuously executing face identification procedures on all camera frames). The method 60 may be repeated and/or parallelized for multiple unidentified individuals moving through the scene.

The illustrated method 60 enhances performance at least to the extent that coordinating face captures between the stationary camera and the non-stationary camera eliminates human error from the camera operation and/or face recognition process. Performance may be further enhanced through the elimination of blind spots. The illustrated method 60 also reduces equipment costs by eliminating any need for a relatively high number of cameras. For example, because the non-stationary cameras are automatically adjustable to different lines of sight, the non-stationary cameras may effectively perform the functionality of a large array of stationary cameras. Moreover, the illustrated method 60 reduces processing costs by dedicating the face recognition to video frames that are known to contain useful content.

Figure 4A:
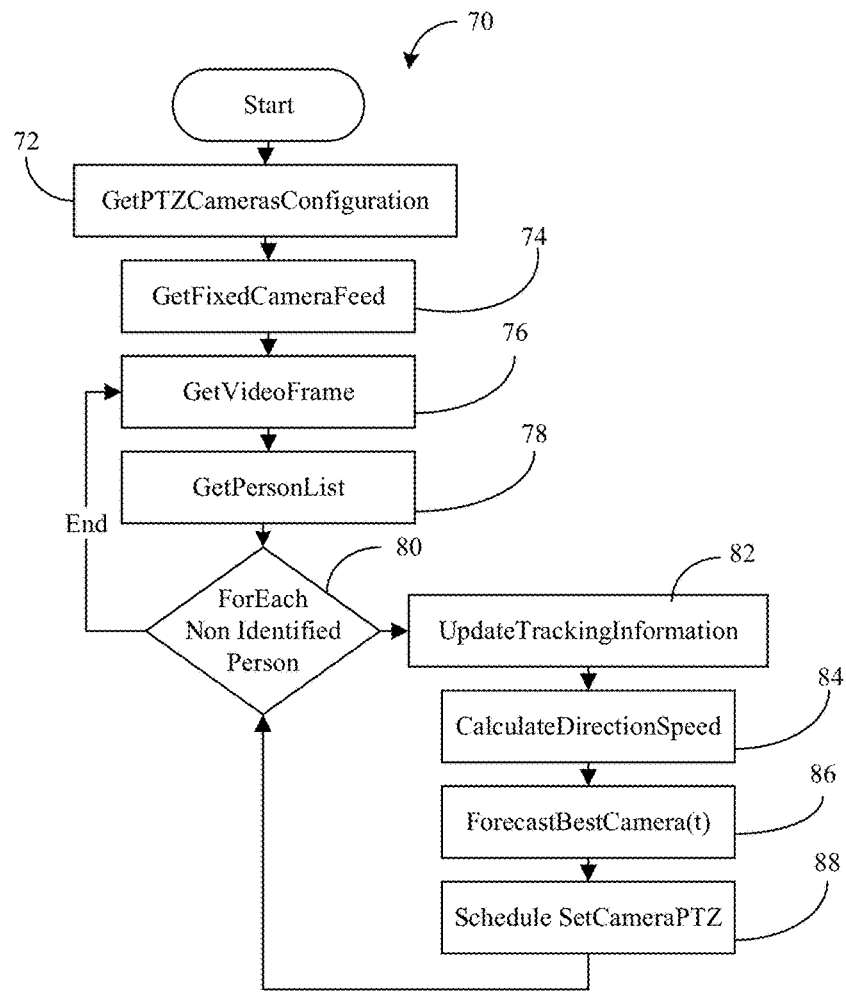
FIG. 4A is a flowchart of an example of a method of operating a video analytics subsystem according to an embodiment.

FIG. 4A shows a method 70 of operating a video analytics subsystem. The method 70 may generally be implemented in a video analytics subsystem such as, for example, the video analytics subsystem 28 (FIG. 1) and/or the video analytics subsystem 50 (FIG. 2), already discussed. More particularly, the method 70 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 72 gets configuration information (e.g., location, pan, tilt and/or zoom settings) for one or more PTZ cameras, where a fixed camera feed is retrieved at block 74. A frame may be retrieved from the fixed camera feed at block 76. Block 78 gets a listing of unidentified individuals captured in the frame, where illustrated block 80 selects the next unidentified individual in the listing. In an embodiment, tracking information is updated at block 82 and block 84 calculates the predicted direction and speed (e.g., trajectory) of the individual. Block 86 may forecast the best camera at a future moment in time (e.g., time t). In one example, block 88 schedules the best camera to capture the individual at the future moment in time. The illustrated method 70 then returns to block 80 and selects the next unidentified individual in the listing. Once the end of the listing is reached, the method returns to block 76 and selects another video frame.

Figure 4B:
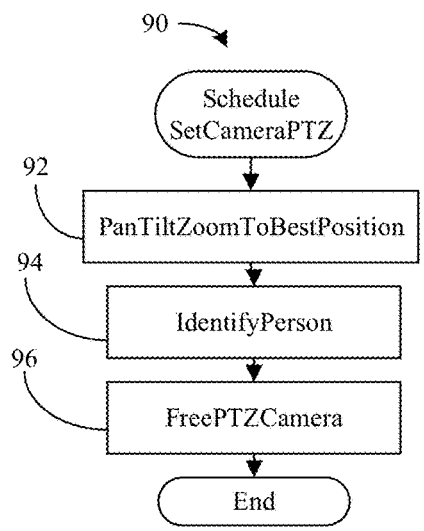
FIG. 4B is a flowchart of an example of a method of operating a PTZ camera according to an embodiment.

FIG. 4B shows a method 90 of PTZ camera. The method 90 may generally be implemented in a non-stationary camera such as, for example, the first and second PTZ cameras 20, 22 (FIG. 1) in response to execution of block 88 (FIG. 4A), already discussed. More particularly, the method 90 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 92 pans, tilts and/or zooms to the best position to capture the face of the unidentified individual, where block 94 identifies the individual. In one example, block 96 frees the PTZ camera to identify another individual.

Returning to FIG. 2, the training process may be specific to each camera topology and sensitive to the environment. Therefore, each deployment of the system undergoes a training process. Training such a system using RL may involve a number of training examples on the order of millions for each case, to address the problem of training time and shorten the time that it takes for the system to reach peak performance. In embodiment, an offline accelerated training module (e.g., including logic instructions, configurable logic, fixed-functionality hardware logic, etc., or any combination thereof) is used. The offline accelerated training module may include a simulator that, given a specific camera topology, produces realistic observations and simulates identification rates for each camera. By using approximate camera models (e.g., parameters from the manufacturer), a rough camera layout (e.g., measured on a blueprint) and multiple people motion models (e.g., Brownian motion, goal directed path planning, straight lines, parametric curves), the simulator generates a trajectory of a person, computes the projection of the person's face on the camera images and determines if the person identification is successful.

To determine if a face projection on a camera is recognizable, a model of the procedure may be used. In one example, the procedure model includes the probability of obtaining a correct identification given the shape of the projected detection on the camera image. Moreover, the model may be built by running the identification algorithm on known datasets with ground truth data and computing a histogram of correct and incorrect detections versus the face bounding box vertical and horizontal sizes.

In an embodiment, the simulator is used to generate millions of training examples of people moving across the area of interest. By using domain randomization techniques on the camera models, camera layouts and adding noise to the generated trajectories, the simulator generates samples that make the RL controller more robust to measurement errors or changes in the camera projection matrices due to aging of the lenses. The usage of the simulator with domain randomization provides a pre-trained system ready to deploy in the real environment. After deployment, the system may re-train the neural networks with real examples (e.g., real-time reinforcement data). The training on simulation data, however, enables the system to start running from day zero and continue increasing performance over time.

Figure 5:
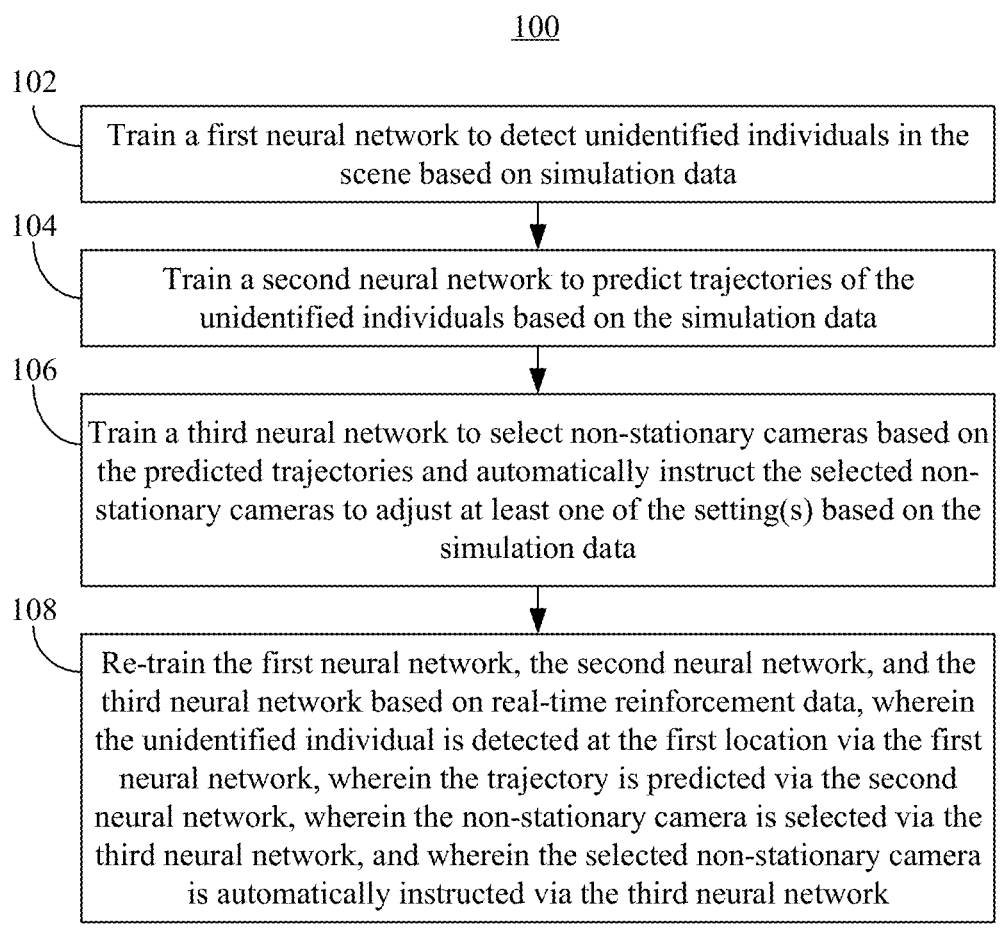
FIG. 5 is a flowchart of an example of a method of training neural networks to support camera orchestration according to an embodiment.

FIG. 5 shows a method 100 of training neural networks to support camera orchestration. The method 100 may generally be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 102 trains a first neural network (e.g., in a space representation stage) to detect unidentified individuals in the scene based on simulation data. Additionally, block 104 may train a second neural network (e.g., recurrent neural network in a trajectory prediction stage) to predict trajectories of the unidentified individuals based on the simulation data. In an embodiment, block 106 trains a third neural network (e.g., policy neural network in a reinforcement learning stage) to select non-stationary cameras based on the predicted trajectories and automatically instruct the selected non-stationary cameras to adjust at least one of the one or more settings based on the simulation data. In one example, blocks 102, 104 and 106 are conducted offline.

Block 108 may re-train the first neural network, the second neural network, and the third neural network based on real-time reinforcement data. In the illustrated example, the unidentified individual from FIG. 3 is detected at the first location via the first neural network. Additionally, the trajectory may be predicted via the second neural network. In an embodiment, the non-stationary camera is selected via the third neural network and the selected non-stationary camera is automatically instructed via the third neural network. The illustrated method 100 therefore further enhances performance by enabling accurate identifications to be made upon deployment of the system.

Figure 6:
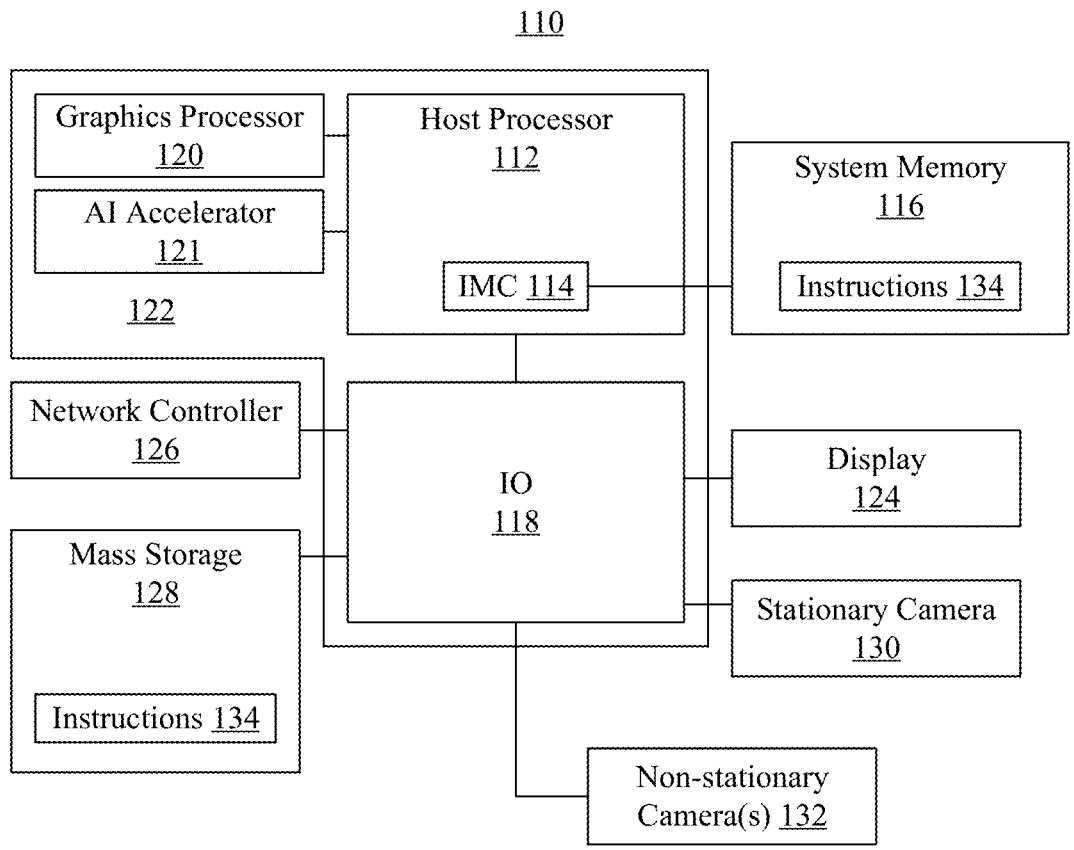
FIG. 6 is a block diagram of an example of a performance-enhanced computing system according to an embodiment.

Turning now to FIG. 6, a performance-enhanced computing system 110 is shown. The system 110 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 110 includes a host processor 112 (e.g., central processing unit/CPU) having an integrated memory controller (IMC) 114 that is coupled to a system memory 116.

The illustrated system 110 also includes an input output (IO) module 118 implemented together with the host processor 112, an AI accelerator 121, and a graphics processor 120 (e.g., graphics processing unit/GPU) on a semiconductor die 122 as a system on chip (SoC). In an embodiment, the semiconductor die 122 also includes a vision processing unit (VPU, not shown). The illustrated IO module 118 communicates with, for example, a display 124 (e.g., touch screen, liquid crystal display/LCD, light emitting diode/LED display), a network controller 126 (e.g., wired and/or wireless), and mass storage 128 (e.g., hard disk drive/HDD, optical disk, solid state drive/SSD, flash memory). The illustrated computing system 110 also includes a stationary (e.g., fixed) camera 130 to generate a video feed of a scene and one or more non-stationary (e.g., PTZ) cameras 132. The stationary camera 130 and the non-stationary camera(s) 132 may communicate with the rest of the system 110 via wired and/or wireless links.

In an embodiment, the host processor 112, the graphics processor 120, the AI accelerator 121, the VPU and/or the IO module 118 execute program instructions 134 retrieved from the system memory 116 and/or the mass storage 128 to perform one or more aspects of the method 60 (FIG. 3), the method 70 (FIG. 4A), the method 90 (FIG. 4B) and/or the method 100 (FIG. 5), already discussed. Thus, execution of the illustrated instructions 134 may cause the die 122 to detect an unidentified individual at a first location along a trajectory in the scene based on the video feed and select a non-stationary camera from the non-stationary camera(s) 132 based on the trajectory and one or more settings (e.g., pan setting, tilt setting, zoom setting) of the selected non-stationary camera. Execution of the instructions 134 may also cause the die 122 to automatically instruct the selected non-stationary camera to adjust at least one of the setting(s), capture a face of the unidentified individual at a second location along the trajectory, and identify the unidentified individual based on the captured face of the unidentified individual. In an embodiment, the selected non-stationary camera is automatically instructed in response to the face of the unidentified individual being absent from the video feed from the stationary camera 130. Additionally, the selected non-stationary camera may be proactively instructed to adjust the at least one of the setting(s) prior to the unidentified individual reaching the second location.

The system 110 is therefore considered to be performance-enhanced at least to the extent that coordinating face captures between the stationary camera 130 and the selected non-stationary camera eliminates human error from the camera operation and/or face recognition process. Performance may be further enhanced through the elimination of blind spots. Identification effectiveness may be further enhanced through the elimination of blind spots by combining the field of view of stationary and non-stationary cameras. The illustrated system 110 also has reduced equipment costs through the elimination of any need for a relatively high number of cameras. For example, because the non-stationary camera(s) 132 are automatically adjustable to different lines of sight, the non-stationary camera(s) 132 may effectively perform the functionality of a large array of stationary cameras. Moreover, the illustrated system 110 reduces processing costs by dedicating the face recognition to video frames that are known to contain useful content.

Figure 7:
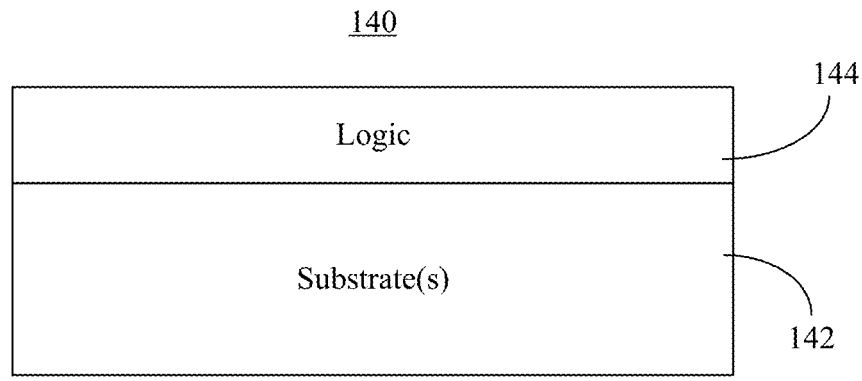
FIG. 7 is an illustration of an example of a semiconductor apparatus according to an embodiment.

FIG. 7 shows a semiconductor package apparatus 140. The illustrated apparatus 140 includes one or more substrates 142 (e.g., silicon, sapphire, gallium arsenide) and logic 144 (e.g., transistor array and other integrated circuit/IC components) coupled to the substrate(s) 142. The logic 144 may be implemented at least partly in configurable logic or fixed-functionality logic hardware. In one example, the logic 144 implements one or more aspects of the method 60 (FIG. 3), the method 70 (FIG. 4A), the method 90 (FIG. 4B) and/or the method 100 (FIG. 5), already discussed. Thus, the logic 144 may detect an unidentified individual at a first location along a trajectory in a scene based on a video feed, wherein the video feed is associated with a stationary camera, and select a non-stationary camera from a plurality of non-stationary cameras based on the trajectory and one or more settings (e.g., pan setting, tilt setting, zoom setting) of the selected non-stationary camera. The logic 144 may also automatically instruct the selected non-stationary camera to adjust at least one of the setting(s), capture a face of the unidentified individual at a second location along the trajectory, and identify the unidentified individual based on the captured face of the unidentified individual.

The apparatus 140 is therefore considered to be performance-enhanced at least to the extent that coordinating face captures between the stationary camera and the selected non-stationary camera eliminates human error from the camera operation and/or face recognition process. Performance may be further enhanced through the elimination of blind spots. The illustrated apparatus 140 also reduces equipment costs through the elimination of any need for a relatively high number of cameras. For example, because the non-stationary cameras are automatically adjustable to different lines of sight, the non-stationary cameras may effectively perform the functionality of a large array of stationary cameras. Moreover, the illustrated apparatus 140 reduces processing costs by dedicating the face recognition to video frames that are known to contain useful content.

In one example, the logic 144 includes transistor channel regions that are positioned (e.g., embedded) within the substrate(s) 142. Thus, the interface between the logic 144 and the substrate(s) 142 may not be an abrupt junction. The logic 144 may also be considered to include an epitaxial layer that is grown on an initial wafer of the substrate(s) 142.

Figure 8:
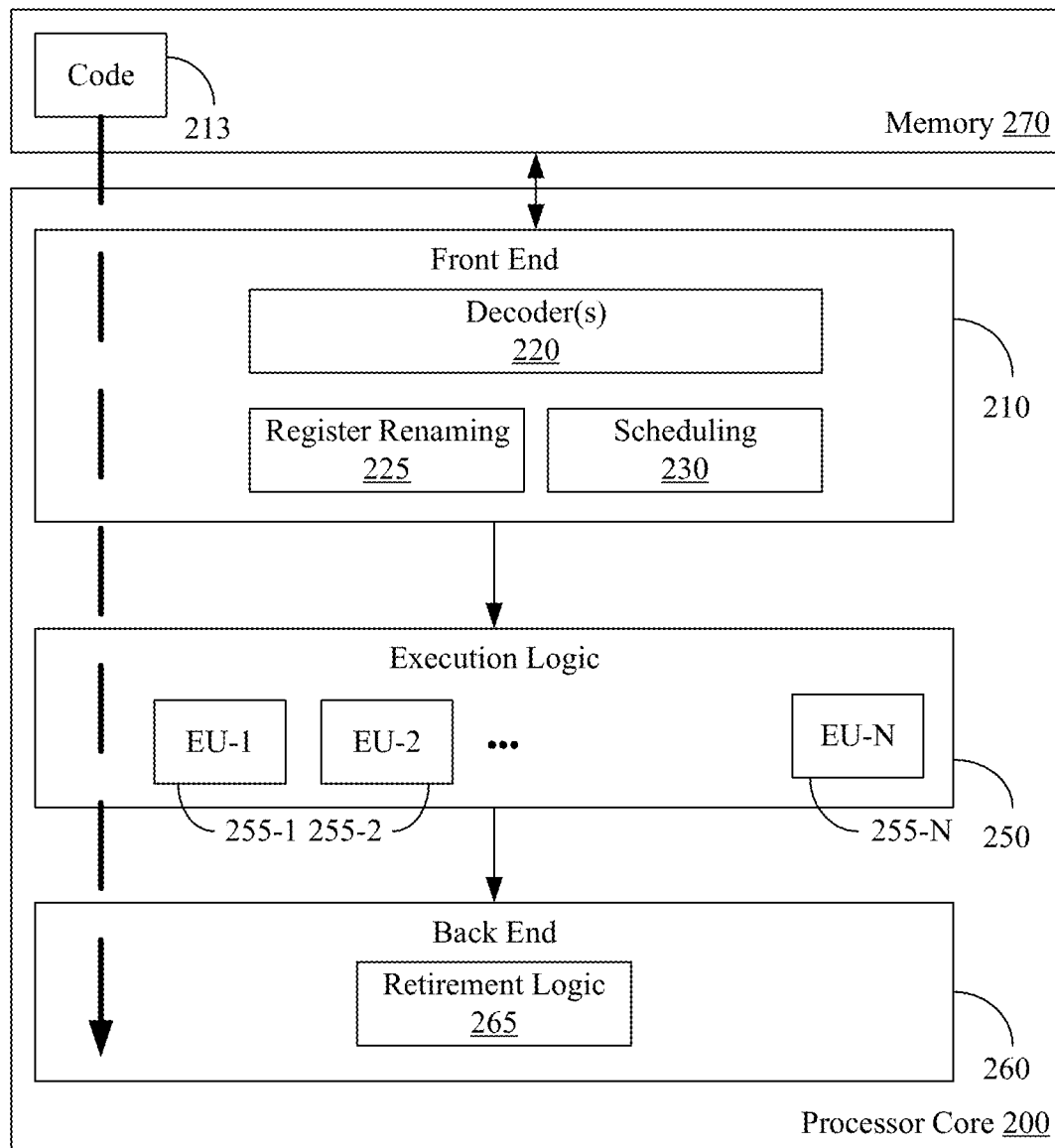
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 60 (FIG. 3), the method 70 (FIG. 4A), the method 90 (FIG. 4B) and/or the method 100 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 9, shown is a block diagram of a computing system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 8.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of method 60 (FIG. 3), the method 70 (FIG. 4A), the method 90 (FIG. 4B) and/or the method 100 (FIG. 5), already discussed. Further, an audio I/O 1024 may be coupled to second bus 1020 and a battery 1010 may supply power to the computing system 1000.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Additional Notes and Examples

Example 1 includes a performance-enhanced computing system comprising a stationary camera to generate a video feed of a scene, a plurality of non-stationary cameras, a processor, and a memory coupled to the processor, the memory including a set of executable program instructions, which when executed by the processor, cause the processor to detect an unidentified individual at a first location along a trajectory in the scene based on the video feed, select a non-stationary camera from the plurality of non-stationary cameras based on the trajectory and one or more settings of the selected non-stationary camera, and automatically instruct the selected non-stationary camera to adjust at least one of the one or more settings, capture a face of the unidentified individual at a second location along the trajectory, and identify the unidentified individual based on the captured face of the unidentified individual.

Example 2 includes the computing system of Example 1, wherein the selected non-stationary camera is to be automatically instructed in response to the face of the unidentified individual being absent from the video feed and wherein the selected non-stationary camera is to be instructed to adjust the at least one of the one or more settings prior to the unidentified individual reaching the second location.

Example 3 includes the computing system of Example 1, wherein the instructions, when executed, further cause the computing system to predict the trajectory based on the video feed.

Example 4 includes the computing system of Example 3, wherein the instructions, when executed, further cause the computing system to train a first neural network to detect unidentified individuals in the scene based on simulation data, train a second neural network to predict trajectories of the unidentified individuals based on the simulation data, and train a third neural network to select non-stationary cameras and automatically instruct the selected non-stationary cameras to adjust at least one of the one or more settings based on the simulation data.

Example 5 includes the computing system of Example 3, wherein the instructions, when executed, further cause the computing system to re-train a first neural network, a second neural network, and a third neural network based on real-time reinforcement data, wherein the unidentified individual is to be detected at the first location via the first neural network, wherein the trajectory is to be predicted via the second neural network, wherein the non-stationary camera is to be selected via the third neural network, and wherein the selected non-stationary camera is to be automatically instructed via the third neural network.

Example 6 includes the computing system of any one of Examples 1 to 5, wherein the one or more settings are to include one or more of a pan setting, a tilt setting or a zoom setting, and wherein the selected non-stationary camera is to be automatically instructed to identify the unidentified individual based on a reduced number of frames containing the captured face of the unidentified individual.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to detect an unidentified individual at a first location along a trajectory in a scene based on a video feed of the scene, wherein the video feed is to be associated with a stationary camera, select a non-stationary camera from a plurality of non-stationary cameras based on the trajectory and one or more settings of the selected non-stationary camera, and automatically instruct the selected non-stationary camera to adjust at least one of the one or more settings, capture a face of the unidentified individual at a second location along the trajectory, and identify the unidentified individual based on the captured face of the unidentified individual.

Example 8 includes the apparatus of Example 7, wherein the selected non-stationary camera is to be automatically instructed in response to the face of the unidentified individual being absent from the video feed and wherein the selected non-stationary camera is to be instructed to adjust the at least one of the one or more settings prior to the unidentified individual reaching the second location.

Example 9 includes the apparatus of Example 7, wherein the logic coupled to the one or more substrates is to predict the trajectory based on the video feed.

Example 10 includes the apparatus of Example 9, wherein the logic coupled to the one or more substrates is to train a first neural network to detect unidentified individuals in the scene based on simulation data, train a second neural network to predict trajectories of the unidentified individuals based on the simulation data, and train a third neural network to select non-stationary cameras and automatically instruct the selected non-stationary cameras to adjust at least one of the one or more settings based on the simulation data.

Example 11 includes the apparatus of Example 9, wherein the logic coupled to the one or more substrates is to re-train a first neural network, a second neural network, and a third neural network based on real-time reinforcement data, wherein the unidentified individual is to be detected at the first location via the first neural network, wherein the trajectory is to be predicted via the second neural network, wherein the non-stationary camera is to be selected via the third neural network, and wherein the selected non-stationary camera is to be automatically instructed via the third neural network.

Example 12 includes the apparatus of any one of Examples 7 to 11, wherein the one or more settings are to include one or more of a pan setting, a tilt setting or a zoom setting, and wherein the selected non-stationary camera is to be automatically instructed to identify the unidentified individual based on a reduced number of frames containing the captured face of the unidentified individual.

Example 13 includes at least one computer readable storage medium comprising a set of executable program instructions, which when executed by a computing system, cause the computing system to detect an unidentified individual at a first location along a trajectory in a scene based on a video feed of the scene, wherein the video feed is to be associated with a stationary camera, select a non-stationary camera from a plurality of non-stationary cameras based on the trajectory and one or more settings of the selected non-stationary camera, and automatically instruct the selected non-stationary camera to adjust at least one of the one or more settings, capture a face of the unidentified individual at a second location along the trajectory, and identify the unidentified individual based on the captured face of the unidentified individual.

Example 14 includes the at least one computer readable storage medium of Example 13, wherein the selected non-stationary camera is to be automatically instructed in response to the face of the unidentified individual being absent from the video feed and wherein the selected non-stationary camera is to be instructed to adjust the at least one of the one or more settings prior to the unidentified individual reaching the second location.

Example 15 includes the at least one computer readable storage medium of Example 13, wherein the instructions, when executed, further cause the computing system to predict the trajectory based on the video feed.

Example 16 includes the at least one computer readable storage medium of Example 15, wherein the instructions, when executed, further cause the computing system to train a first neural network to detect unidentified individuals in the scene based on simulation data, train a second neural network to predict trajectories of the unidentified individuals based on the simulation data, and train a third neural network to select non-stationary cameras and automatically instruct the selected non-stationary cameras to adjust at least one of the one or more settings based on the simulation data.

Example 17 includes the at least one computer readable storage medium of Example 15, wherein the instructions, when executed, further cause the computing system to re-train a first neural network, a second neural network, and a third neural network based on real-time reinforcement data, wherein the unidentified individual is to be detected at the first location via the first neural network, wherein the trajectory is to be predicted via the second neural network, wherein the non-stationary camera is to be selected via the third neural network, and wherein the selected non-stationary camera is to be automatically instructed via the third neural network.

Example 18 includes the at least one computer readable storage medium of any one of Examples 13 to 17, wherein the one or more settings are to include one or more of a pan setting, a tilt setting or a zoom setting, and wherein the selected non-stationary camera is to be automatically instructed to identify the unidentified individual based on a reduced number of frames containing the captured face of the unidentified individual.

Example 19 includes a method of operating a performance-enhanced computing system, the method comprising detecting an unidentified individual at a first location along a trajectory in a scene based on a video feed of the scene, wherein the video feed is associated with a stationary camera, selecting a non-stationary camera from a plurality of non-stationary cameras based on the trajectory and one or more settings of the selected non-stationary camera, and automatically instructing the selected non-stationary camera to adjust at least one of the one or more settings, capture a face of the unidentified individual at a second location along the trajectory, and identify the unidentified individual based on the captured face of the unidentified individual.

Example 20 includes the method of Example 19, wherein the selected non-stationary camera is automatically instructed in response to the face of the unidentified individual being absent from the video feed and wherein the selected non-stationary camera is instructed to adjust the at least one of the one or more settings prior to the unidentified individual reaching the second location.

Example 21 includes the method of Example 19, further including predicting the trajectory based on the video feed.

Example 22 includes the method of Example 21, further including training a first neural network to detect unidentified individuals in the scene based on simulation data, training a second neural network to predict trajectories of the unidentified individuals based on the simulation data, and training a third neural network to select non-stationary cameras based on the predicted trajectories and automatically instruct the selected non-stationary cameras to adjust at least one of the one or more settings based on the simulation data.

Example 23 includes the method of Example 21, further including re-training a first neural network, a second neural network, and a third neural network based on real-time reinforcement data, wherein the unidentified individual is detected at the first location via the first neural network, wherein the trajectory is predicted via the second neural network, wherein the non-stationary camera is selected via the third neural network, and wherein the selected non-stationary camera is automatically instructed via the third neural network.

Example 24 includes the method of any one of Examples 19 to 23, wherein the one or more settings include one or more of a pan setting, a tilt setting or a zoom setting, and wherein the selected non-stationary camera is automatically instructed to identify the unidentified individual based on a reduced number of frames containing the captured face of the unidentified individual.

Example 25 includes means for performing the method of any one of Examples 19 to 24.

Thus, technology described herein provides a cost-efficient solution for the automated identification of individuals. Additionally, fewer cameras are required on the "scene", which reduces CAPEX (Capital Expenditure, e.g., for purchasing and deploying cameras) and OPEX (Operational Expense, e.g., reducing the need for operators of the computer vision infrastructure). The technology also reduces the compute capacity required for identification since the cameras will be proactively set on the correct position to capture faces, meaning less frame processing. Additionally, the technology enables the selective execution of face identification procedures on specific camera frames instead of continuously executing the procedures on all camera frames. In a certain situation, the system prepares a PTZ camera to point to a specific position at a specific time. Once reached, the identification process can be executed for a window of time, but the process is not continuously running.

Moreover, the technology is highly efficient on identification without relying on the attention of human operators. Even more, the work of the operator is automated, reducing OPEX. The technology is also highly efficient on identification being able to monitor many different video feeds in parallel, compared with human monitoring that may be able to check only a few video feeds.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
    one or more stationary cameras to generate a video feed of a scene;
    a plurality of non-stationary cameras;
    a processor; and
    a memory coupled to the processor, the memory including a set of executable program instructions, which when executed by the processor, cause the computing system to:
    detect, via a first neural network, an unidentified individual at a first location along a trajectory in the scene based on the video feed, wherein the trajectory is to be predicted via a second neural network,
    select, via a third neural network, a non-stationary camera from the plurality of non-stationary cameras based on the trajectory in the scene from the video feed of the one or more stationary cameras and on one or more settings of the selected non-stationary camera,
    automatically instruct the selected non-stationary camera to adjust at least one of the one or more settings, capture a face of the unidentified individual at a second location along the trajectory, and identify the unidentified individual based on the captured face of the unidentified individual, wherein the selected non-stationary camera is to be automatically instructed via the third neural network; and
    perform face detection via a fourth neural network and provide feedback about results of the face detection to the first neural network, the second neural network and the third neural network.

2. The computing system of claim 1, wherein the selected non-stationary camera is to be automatically instructed in response to the face of the unidentified individual being absent from the video feed and wherein the selected non-stationary camera is to be instructed to adjust the at least one of the one or more settings prior to the unidentified individual reaching the second location.

3. The computing system of claim 1, wherein the instructions, when executed, further cause the computing system to predict the trajectory based on the video feed.

4. The computing system of claim 3, wherein the instructions, when executed, further cause the computing system to:
train the first neural network to detect unidentified individuals in the scene based on simulation data,
train the second neural network to predict trajectories of the unidentified individuals based on the simulation data, and
train the third neural network to select non-stationary cameras and automatically instruct the selected non-stationary cameras to adjust at least one of the one or more settings based on the simulation data.

5. The computing system of claim 3, wherein the instructions, when executed, further cause the computing system to re-train the first neural network, the second neural network, and the third neural network based on real-time reinforcement data.

6. The computing system of claim 1, wherein the one or more settings are to include one or more of a pan setting, a tilt setting or a zoom setting, and wherein the selected non-stationary camera is to be automatically instructed to identify the unidentified individual based on a reduced number of frames containing the captured face of the unidentified individual.

7. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
detect, via a first neural network, an unidentified individual at a first location along a trajectory in a scene based on a video feed of the scene, wherein the video feed is to be associated with a stationary camera, and wherein the trajectory is to be predicted via a second neural network;
select, via a third neural network, a non-stationary camera from a plurality of non-stationary cameras based on the trajectory in the scene from the video feed associated with the stationary camera and on one or more settings of the selected non-stationary camera;
automatically instruct the selected non-stationary camera to adjust at least one of the one or more settings, capture a face of the unidentified individual at a second location along the trajectory, and identify the unidentified individual based on the captured face of the unidentified individual, wherein the selected non-stationary camera is to be automatically instructed via the third neural network; and
perform face detection via a fourth neural network and provide feedback about results of the face detection to the first neural network, the second neural network and the third neural network.

8. The apparatus of claim 7, wherein the selected non-stationary camera is to be automatically instructed in response to the face of the unidentified individual being absent from the video feed and wherein the selected non-stationary camera is to be instructed to adjust the at least one of the one or more settings prior to the unidentified individual reaching the second location.

9. The apparatus of claim 7, wherein the logic coupled to the one or more substrates is to predict the trajectory based on the video feed.

10. The apparatus of claim 9, wherein the logic coupled to the one or more substrates is to:
train the first neural network to detect unidentified individuals in the scene based on simulation data;
train the second neural network to predict trajectories of the unidentified individuals based on the simulation data; and
train the third neural network to select non-stationary cameras and automatically instruct the selected non-stationary cameras to adjust at least one of the one or more settings based on the simulation data.

11. The apparatus of claim 9, wherein the logic coupled to the one or more substrates is to re-train the first neural network, the second neural network, and the third neural network based on real-time reinforcement data.

12. The apparatus of claim 7, wherein the one or more settings are to include one or more of a pan setting, a tilt setting or a zoom setting, and wherein the selected non-stationary camera is to be automatically instructed to identify the unidentified individual based on a reduced number of frames containing the captured face of the unidentified individual.

13. At least one computer readable storage medium comprising a set of executable program instructions, which when executed by a computing system, cause the computing system to:
detect, via a first neural network, an unidentified individual at a first location along a trajectory in a scene based on a video feed of the scene, wherein the video feed is to be associated with a stationary camera, and wherein the trajectory is to be predicted via a second neural network;
select, via a third neural network, a non-stationary camera from a plurality of non-stationary cameras based on the trajectory in the scene from the video feed associated with the stationary camera and on one or more settings of the selected non-stationary camera;
automatically instruct the selected non-stationary camera to adjust at least one of the one or more settings, capture a face of the unidentified individual at a second location along the trajectory, and identify the unidentified individual based on the captured face of the unidentified individual, wherein the selected non-stationary camera is to be automatically instructed via the third neural network; and
perform face detection via a fourth neural network and provide feedback about results of the face detection to the first neural network, the second neural network and the third neural network.

14. The at least one computer readable storage medium of claim 13, wherein the selected non-stationary camera is to be automatically instructed in response to the face of the unidentified individual being absent from the video feed and wherein the selected non-stationary camera is to be instructed to adjust the at least one of the one or more settings prior to the unidentified individual reaching the second location.

15. The at least one computer readable storage medium of claim 13, wherein the instructions, when executed, further cause the computing system to predict the trajectory based on the video feed.

16. The at least one computer readable storage medium of claim 15, wherein the instructions, when executed, further cause the computing system to:
- train the first neural network to detect unidentified individuals in the scene based on simulation data;
- train the second neural network to predict trajectories of the unidentified individuals based on the simulation data; and
- train the third neural network to select non-stationary cameras and automatically instruct the selected non-stationary cameras to adjust at least one of the one or more settings based on the simulation data.

17. The at least one computer readable storage medium of claim 15, wherein the instructions, when executed, further cause the computing system to re-train the first neural network, the second neural network, and the third neural network based on real-time reinforcement data.

18. The at least one computer readable storage medium of claim 13, wherein the one or more settings are to include one or more of a pan setting, a tilt setting or a zoom setting, and wherein the selected non-stationary camera is to be automatically instructed to identify the unidentified individual based on a reduced number of frames containing the captured face of the unidentified individual.

19. A method comprising:
- detecting, via a first neural network, an unidentified individual at a first location along a trajectory in a scene based on a video feed of the scene, wherein the video feed is associated with a stationary camera, and wherein the trajectory is to be predicted via a second neural network;
- selecting, via a third neural network, a non-stationary camera from a plurality of non-stationary cameras based on the trajectory in the scene from the video feed associated with the stationary camera and on one or more settings of the selected non-stationary camera;
- automatically instructing the selected non-stationary camera to adjust at least one of the one or more settings, capture a face of the unidentified individual at a second location along the trajectory, and identify the unidentified individual based on the captured face of the unidentified individual, wherein the selected non-stationary camera is to be automatically instructed via the third neural network; and
- performing face detection via a fourth neural network and provide feedback about results of the face detection to the first neural network, the second neural network and the third neural network.

20. The method of claim 19, wherein the selected non-stationary camera is automatically instructed in response to the face of the unidentified individual being absent from the video feed and wherein the selected non-stationary camera is instructed to adjust the at least one of the one or more settings prior to the unidentified individual reaching the second location.

21. The method of claim 19, further including predicting the trajectory based on the video feed.

22. The method of claim 21, further including:
- training the first neural network to detect unidentified individuals in the scene based on simulation data;
- training the second neural network to predict trajectories of the unidentified individuals based on the simulation data; and
- training the third neural network to select non-stationary cameras based on the predicted trajectories and automatically instruct the selected non-stationary cameras to adjust at least one of the one or more settings based on the simulation data.

23. The method of claim 21, further including re-training the first neural network, the second neural network, and the third neural network based on real-time reinforcement data.

24. The method of claim 19, wherein the one or more settings include one or more of a pan setting, a tilt setting or a zoom setting, and wherein the selected non-stationary camera is automatically instructed to identify the unidentified individual based on a reduced number of frames containing the captured face of the unidentified individual.

25. The computing system of claim 1, wherein the first neural network, the second neural network and the third neural network are to adjust based on the feedback about results of the face detection.

26. The apparatus of claim 7, wherein the first neural network, the second neural network and the third neural network are to adjust based on the feedback about results of the face detection.

27. The at least one computer readable storage medium of claim 13, wherein the first neural network, the second neural network and the third neural network are to adjust based on the feedback about results of the face detection.

28. The method of claim 19, wherein the first neural network, the second neural network and the third neural network adjust based on the feedback about results of the face detection.

* * * * *